A. L. COX.
WASHING APPARATUS.
APPLICATION FILED MAR. 28, 1914.

1,132,449.

Patented Mar. 16, 1915.

Witnesses

Inventor
A. L. Cox,
By C. L. Parker.

UNITED STATES PATENT OFFICE.

ALVIN L. COX, OF ELIZABETHTOWN, KENTUCKY.

WASHING APPARATUS.

1,132,449.  Specification of Letters Patent.  Patented Mar. 16, 1915.

Application filed March 28, 1914. Serial No. 827,931.

*To all whom it may concern:*

Be it known that I, ALVIN L. COX, a citizen of the United States, residing at Elizabethtown, in the county of Hardin and State of Kentucky, have invented certain new and useful Improvements in Washing Apparatus, of which the following is a specification.

My invention relates to improvements in washing apparatus, for use in cleaning buggies, automobiles, windows or the like, and has particular reference to such apparatus embodying a scrubbing or brushing element which is flexibly connected with a tubular handle and normally preferably arranged in longitudinal or axial alinement therewith, said tubular handle being provided near the scrubbing or brushing element with apertures for spraying the water upon the same in a novel manner.

An important object of the invention is to provide apparatus of the above mentioned character, which is simple in construction, inexpensive to manufacture, and highly convenient in use.

Other objects and advantages of the invention will be apparent during the course of the following description.

Figure 1:
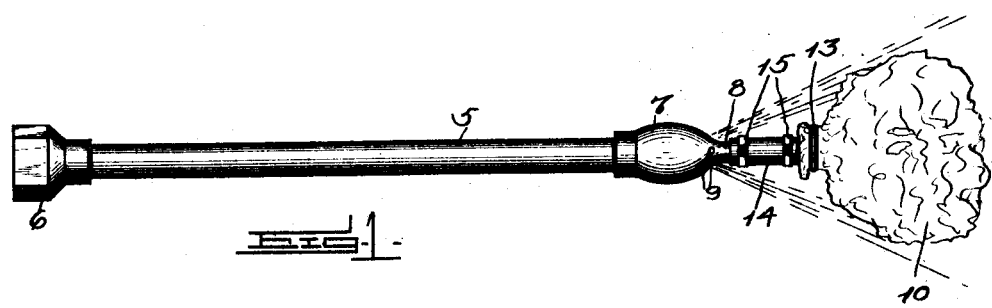
Figure 2:
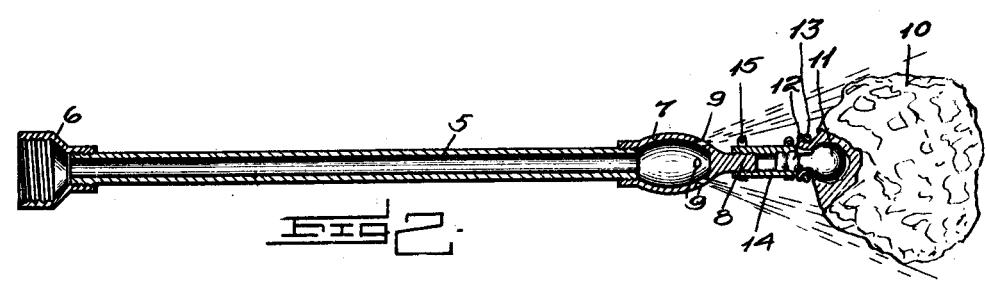
Figure 3:
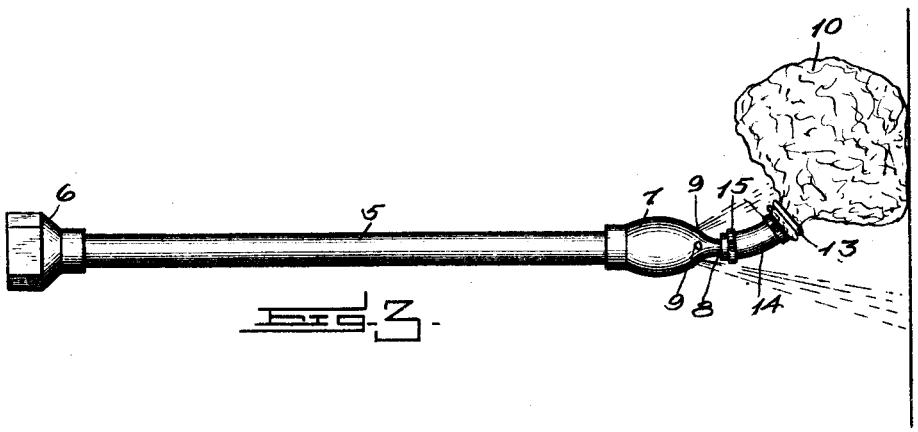

In the accompanying drawings forming a part of this specification and in which like numerals are employed to designate like parts throughout the same, Figure 1 is a side elevation of apparatus embodying my invention, Fig. 2 is a central longitudinal sectional view through the same, and, Fig. 3 is a side elevation of the apparatus showing the brushing or scrubbing element angularly arranged with relation to the handle.

In the drawings, wherein for the purpose of illustration is shown a preferred embodiment of my invention, the numeral 5 designates a tubular handle, the outer end of which is provided with a coupling 6, for connection with a hose (not shown) which supplies the water to the same. At its opposite end the tubular handle 5 is screw-threaded, for connection with the inner screw-threaded portion of an outwardly bulging or bulbous-shaped shell 7, the opposite end of which is closed and is provided with an axially extending shank 8, as shown. The shell 7 is provided adjacent the base of the shank 8 with angularly arranged apertures or openings 9, to spray the water, for a purpose to be explained.

The numeral 10 designates a brushing or scrubbing element, preferably in the form of a sponge. This sponge has the inner portion of its material extended or folded about an enlarged head 11, formed upon a shank 12. This inner portion of the sponge is secured or bound to the shank 12 and head 11, by suitable tying or clamping means 13.

The shanks 8 and 12 are spaced in end to end relation, and are provided upon their peripheries with corrugations, as shown. These shanks are adapted to be inserted within the opposite ends of a suitably flexible tube or tubular coupling 14, which I have found may be advantageously formed of a section of ordinary hose. The opposite ends of this tube or tubular coupling are secured to the shanks by tying or clamping means 15, as shown. This flexible tube or tubular coupling 14 affords a universal connection between the sponge and tubular handle, possessing the desired degree of flexibility.

In the use of the apparatus, the water is continuously supplied to the tubular handle 5 and is sprayed through the angularly arranged outwardly diverging apertures or openings 9, in outwardly diverging suitably fine streams, which when the sponge 10 is in its normal position in longitudinal or axial alinement with the tubular handle, pass about and in engagement with the sides of the sponge. These apertures provide an approximately conical-shaped spray adapted to surround the sponge. As clearly shown in Fig. 3, the sponge may assume an angular position with relation to the tubular handle, and when in this position a portion of the spray passes directly upon the sponge while the other portion thereof is directed upon the object being cleaned, to rinse the same. By the flexible connection embodying the tube 14, the sponge 10 may be angularly arranged with respect to the handle, in a highly convenient manner, by the operator exerting suitable pressure upon the handle while the sponge engages the object being cleaned.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having described my invention, I claim:—

In washing apparatus of the character described, a tubular handle, an approximately bulbous-shaped shell connected with one end thereof and provided with an axially extending shank and angularly arranged apertures disposed near the shank for the passage of the water, a brushing element, a head having the brushing element secured thereto and provided with a shank, and a flexible tube receiving the shanks in the opposite ends thereof.

In testimony whereof I affix my signature in presence of two witnesses.

ALVIN L. COX.

Witnesses:
C. L. PARKER,
R. P. FISHBURNE.